United States Patent [19]

Mieda et al.

[11] Patent Number: 5,615,180
[45] Date of Patent: Mar. 25, 1997

[54] MAGNETO-OPTICAL RECORDING MEDIUM AND MAGNETO-OPTICAL RECORDING APPARATUS CAPABLE OF PERFORMING A LIGHT-MODULATION OVERWRITING OPERATION

[75] Inventors: Michinobu Mieda; Junichiro Nakayama, both of Shiki-gun; Hiroyuki Katayama; Akira Takahashi, both of Nara; Kenji Ohta, Kitakatsuragi-gun, all of Japan

[73] Assignee: Sharp Kabushiki Kaisha, Osaka, Japan

[21] Appl. No.: 198,620

[22] Filed: Feb. 18, 1994

[30] Foreign Application Priority Data

Feb. 22, 1993 [JP] Japan .................................. 5-032115
Jul. 22, 1993 [JP] Japan .................................. 5-180980

[51] Int. Cl.$^6$ ........................................................ G11B 11/00
[52] U.S. Cl. ........................ 369/13; 360/59; 428/694 ML
[58] Field of Search ........................ 369/110, 13, 275.3, 369/14, 275.2, 112, 288, 283, 284, 286; 428/694 MM, 694 ML, 694 SC; 365/122; 360/59, 114

[56] References Cited

U.S. PATENT DOCUMENTS

| 5,202,862 | 4/1993 | Ohta et al. | 369/13 |
|---|---|---|---|
| 5,241,520 | 8/1993 | Ohta et al. | 369/13 |
| 5,278,810 | 1/1994 | Takahashi et al. | 369/13 |
| 5,428,585 | 6/1995 | Hirokane et al. | 369/13 |

FOREIGN PATENT DOCUMENTS

| 63-285740 | 11/1988 | Japan . |
|---|---|---|
| 2156450 | 6/1990 | Japan . |
| 62-23420 | 8/1994 | Japan . |

OTHER PUBLICATIONS

"Direct Overwrite by Light Power Modulation on Magneto–Optical Multi–Layered Media", Saito, et al. Proc. Int. Symp. on Optical Memory, 1987, Japanese Journal of Applied Physics, vo.. 26 (1987) Suppl 26–4.

"New Direct Overwriting using a Magneto–Optical Trilayer Medium and a Magnet", J. Nakayama, et al, Mecatronics Systems Labs., Sharp Corp., ISOM/OOS 93 Conf. Digest, Jul. 5, 1993.

Primary Examiner—Ali Neyzari
Attorney, Agent, or Firm—David G. Conlin; Milton Oliver

[57] ABSTRACT

A magneto-optical disk is provided with a recording layer that exhibits perpendicular magnetization, an intermediate layer wherein in-plane magnetization occurs at room temperature and a transition from the in-plane magnetization to perpendicular magnetization occurs as the temperature thereof rises, and an auxiliary layer that is made of a rare-earth-transition-metal alloy and that exhibits perpendicular magnetization, and these layers are laminated in this order. The composition of the rare-earth-transition-metal alloy is set so that the magnetic moment of the rare-earth metal is relatively greater than that of the transition metal at room temperature and the compensation temperature is located between room temperature and the Curie temperature $T_{c3}$. A magneto-optical recording apparatus for rewriting information on the magneto-optical disk is provided with a single magnet for applying $H_w$ onto a portion on the magneto-optical disk irradiated by a light beam, as well as for applying $H_{init}$ having a greater intensity than $H_w$ onto a portion that is apart from the portion irradiated by the light beam. This arrangement makes it possible to achieve a more compact, thinner magneto-optical recording apparatus which allows light-modulation overwriting.

10 Claims, 8 Drawing Sheets

MAGNETO-OPTICAL RECORDING MEDIUM AND MAGNETO-OPTICAL RECORDING APPARATUS CAPABLE OF PERFORMING A LIGHT-MODULATION OVERWRITING OPERATION

FIELD OF THE INVENTION

The present invention relates to a magneto-optical recording medium, such as magneto-optical disks and magneto-optical cards, and to a magneto-optical recording apparatus for enabling light-modulation overwriting on the magneto-optical recording medium.

BACKGROUND OF THE INVENTION

Recently, magneto-optical memory devices such as magneto-optical disks have received much attention as memory devices having great densities and large capacities that are capable of rewriting information. Among the magneto-optical memory devices, those which are capable of light-modulation overwriting have been demanded year after year because they make it possible to rewrite information without erasing former information, to enable two-sided recording, and to be easily adapted for use in multi-beam operation.

As described in Jpn. J. Appl. Phys., Vol. 26(1987) Suppl. p. 155–159, the magneto-optical memory device that is capable of light-modulation overwriting has a recording layer and an auxiliary layer that are constituted of perpendicularly magnetized films.

FIG. 13 shows a magneto-optical disk apparatus, which is one example of magneto-optical recording apparatus for use with the magneto-optical memory device of this type.

The magneto-optical disk apparatus is provided with an objective lens 27 for converging a light beam 26 onto a magneto-optical disk, a magnet 24 for use in initialization, and a magnet 25 used for recording.

The magneto-optical disk has an arrangement wherein a recording layer 22 and an auxiliary layer 23 are laminated on a substrate 21. The recording layer 22 has a higher coercive force and a lower Curie temperature than the auxiliary layer 23, and is used for maintaining information and reading information. The auxiliary layer 23 is used for copying information onto the recording layer 22 and erasing information from the recording layer 22 by utilizing an exchange coupling force that is exerted between the recording layer 22 and the auxiliary layer 23.

Upon conducting a light-modulation overwriting operation, the auxiliary layer 23 is first initialized. That is, the magnetization direction of the auxiliary layer 23 is uniformly arranged to one direction by applying an initializing magnetic field from the magnet 24. Then, information is rewritten through the overwriting operation by modulating the intensity of the light beam 26 into high and low levels while applying a writing magnetic field having the direction opposite to the initializing magnetic field from the magnet 25 to an area which is being irradiated by the light beam 26.

More specifically, when the light beam 26 of the high level is projected, the temperature of a portion of the auxiliary layer 23 located at the area irradiated by the light beam 26 rises up to the vicinity of the Curie temperature ($T_{c3}$), thereby allowing the magnetization direction to be reversed by the writing magnetic field. When the irradiated area of the light beam 26 is shifted due to the rotation of the magneto-optical disk, the above-mentioned portion of the auxiliary layer 23 cools off. When the temperature of the portion of the auxiliary layer 23 drops to the vicinity of the Curie temperature ($T_{c1}$) of the recording layer 22, the magnetization direction of the recording layer 22 becomes coincident with that of the auxiliary layer 23 due to an exchange coupling force that is exerted on an interface between the recording layer 22 and the auxiliary layer 23.

In the case of projecting the light beam 26 of the low level, the temperature of the auxiliary layer 23 rises up to merely the vicinity of $T_{c1}$. Therefore, the magnetization direction of the auxiliary layer 23 is not reversed by the writing magnetic field. The magnetization direction of the recording layer 22 becomes coincident with that of the auxiliary layer 23 in the same manner as described above.

As described above, the conventional magneto-optical disk apparatus has achieved the realization of light-modulation overwriting operation that is carried out on the recording layer 22 by the use of the auxiliary layer 23.

In contrast, upon reproducing information thus recorded, the rotation of polarization plane, which is caused by the magneto-optical effect, is detected by applying the light beam 26 having a smaller intensity than that used in recording.

However, in the conventional light-modulation overwriting method, there arises a problem wherein two magnets 24 and 25 have to be installed since the initializing magnetic field and the writing magnetic field are required.

Moreover, since the intensity of the magnetic field required for the initialization ranges from 400 to 500 kA/m, it is necessary to install a large magnet 24 for the initialization. This causes an adverse effect on making the magneto-optical disk apparatus more compact and thinner.

SUMMARY OF THE INVENTION

It is an objective of the present invention to provide a magneto-optical recording medium which allows light-modulation overwriting using only one external magnet.

In order to achieve the above objective, the magneto-optical recording medium of the present invention is provided with a recording layer that exhibits perpendicular magnetization, an intermediate layer wherein in-plane magnetization occurs at room temperature and a transition from the in-plane magnetization to perpendicular magnetization occurs as the temperature thereof rises, and an auxiliary layer that is made of a rare-earth-transition-metal alloy and that exhibits perpendicular magnetization, those layers being laminated in this order. The magneto-optical recording medium is characterized by a composition of the rare-earth-transition-metal alloy of the auxiliary layer that is set so that the magnetic moment of the rare-earth metal is relatively greater than that of the transition metal at room temperature, and the compensation temperature is located between room temperature and the Curie temperature.

With the above arrangement, since the intermediate layer, wherein in-plane magnetization occurs at room temperature and a transition from the in-plane magnetization to the perpendicular magnetization occurs as the temperature thereof rises, is formed between the recording layer and the auxiliary layer, the exchange coupling force is no longer exerted between the recording layer and the auxiliary layer at room temperature. This makes it possible to minimize the magnetic field to be applied upon initializing the auxiliary layer at room temperature. Moreover, the composition of the auxiliary layer is set so that the magnetic moment of the rare-earth metal is relatively greater than that of the transition metal at room temperature, and the compensation temperature is located between room temperature and the Curie temperature; this allows the initializing magnetic field and the writing magnetic field to have the same direction. Thus, it becomes possible to apply the initializing magnetic field and the writing magnetic field merely by providing a single external-magnetic-field applying means that is disposed so that a connecting line passing through both of the poles is virtually parallel to the magneto-optical recording medium.

Furthermore, it is another objective of the present invention to provide a more compact, thinner magneto-optical recording apparatus by adopting the above-mentioned magneto-optical recording medium.

In order to achieve the above objective, the magneto-optical recording apparatus of the present invention is characterized by having an objective lens for converging a light beam onto the magneto-optical recording medium and a single external-magnetic-field applying means for applying a writing magnetic field onto a portion on the magneto-optical recording medium irradiated by the light beam, as well as for applying an initializing magnetic field having a greater intensity than the writing magnetic field on a portion that is apart from the portion irradiated by the light beam, the external-magnetic-field applying means being disposed so that a connecting line passing through both of the poles of the external-magnetic-field applying means is virtually parallel to the magneto-optical recording medium.

With the above arrangement wherein the aforementioned magneto-optical recording medium is adopted, it is possible to allow the initializing magnetic field and the writing magnetic field to have the same direction; therefore, by disposing the external-magnetic-field applying means so that the connecting line passing through both of the poles of the external-magnetic-field applying means is virtually parallel to the magneto-optical recording medium, the recording and initialization of information are conducted by using merely one external-magnetic-field applying means. If the external-magnetic-field applying means is disposed so that the writing magnetic field is applied to a portion on the magneto-optical recording medium that is irradiated by the light beam while the initializing magnetic field having a greater intensity than the writing magnetic field is applied to a portion that is apart from the portion irradiated by the light beam, the single external-magnetic-field applying means may be commonly used for the initialization and recording. This makes it possible to achieve a more compact, thinner magneto-optical recording apparatus which allows light-modulation overwriting.

Moreover, in the magneto-optical recording apparatus of the present invention, any magneto-optical recording media other than the magneto-optical medium of the present invention may be also adopted, as long as they are used for light-modulation overwriting and have an arrangement wherein the initializing magnetic field and the recording magnetic field have the same direction and the initializing magnetic field is substantially small. Greater initializing magnetic fields require magnets of larger sizes; this reduces the advantage of compactness and thinness. Therefore, it is preferable to set the initializing magnetic field to not more than 240 kA/m.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 12, the following description will discuss one embodiment of the present invention.

Figure 1:
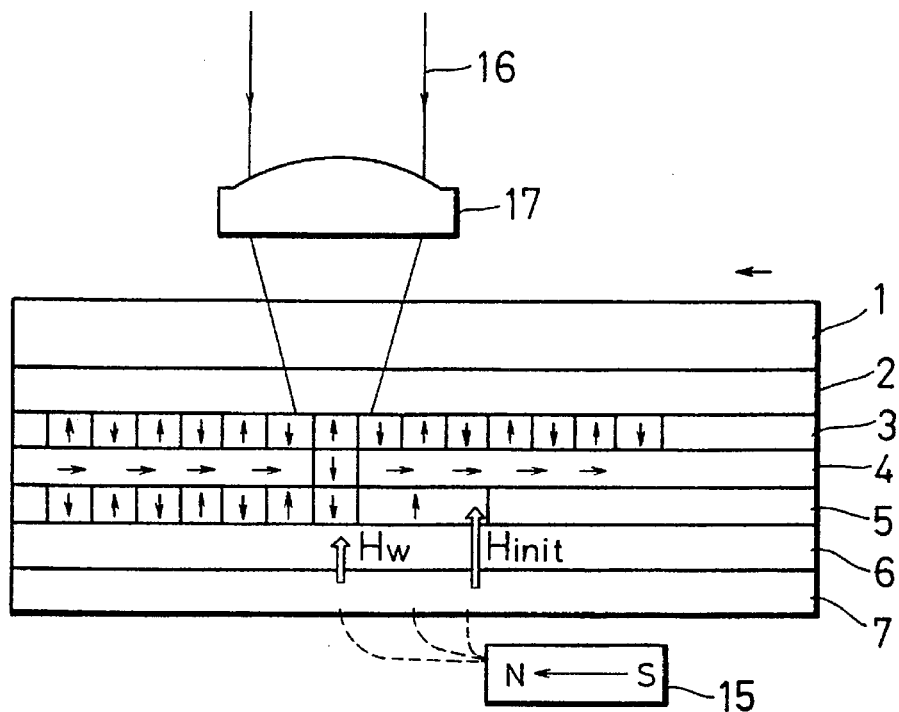
FIG. 1 is a schematic illustration of a magneto-optical disk and a magneto-optical disk apparatus of the present invention.

As illustrated in FIG. 1, a magneto-optical disk apparatus of the present invention is provided with an objective lens 17 and a magnet 15 (external-magnetic-field applying means). The objective lens 17, which is installed on the substrate 1 side of a magneto-optical disk (magneto-optical recording medium), converges a light beam 16 onto a recording layer 3 of the magneto-optical disk. The magnet 15, which is installed on the opposite side to the substrate 1 side of the magneto-optical disk, generates an initializing magnetic field $(H_{init})$ and a writing magnetic field $(H_w)$.

Assuming that the side toward which the magneto-optical disk is rotated (the left side of the drawing) is the front side, the magnet 15 is disposed on the rear side of a portion irradiated by the light beam 16 so that a line connecting both of the poles of the magnet 15 is virtually parallel to the magneto-optical disk. In other words, the magnetization direction of the magnet 15 is virtually parallel to the magneto-optical disk. Since the magnet-15 is disposed in this manner, the magnetic field $H_{init}$ is applied to the magneto-optical disk prior to an application of the light beam 16, and the magnetic field $H_w$, which is virtually parallel to $H_{init}$ and weaker than $H_{init}$, is applied to the portion irradiated by the light beam 16.

The magneto-optical disk has an arrangement wherein a transparent dielectric layer 2, a recording layer 3, an intermediate layer 4, an auxiliary layer 5, a protective layer 6, and overcoat layer 7 are laminated on a substrate 1 in this order.

The recording layer 3 is made of a rare-earth-transition-metal alloy which exhibits perpendicular magnetization from room temperature to the Curie temperature ($T_{c1}$). The composition of the rare-earth-transition-metal alloy is determined so that, at room temperature, the magnetic moment of the transition metal becomes greater than the magnetic moment of the rare-earth metal, that is, so that the transition metal is richer than the rare-earth metal. It is desirable for the recording layer 3 to have a great coercive force at room temperature; therefore, it is desirably set to not less than 200 kA/m. $T_{c1}$ is desirably set within the range of 150° to 200° C.

The intermediate layer 4 is made of a material that virtually exhibits the in-plane magnetization at room temperature and that has a transition from the in-plane magnetization to the perpendicular magnetization at temperatures higher than room temperature.

The auxiliary layer 5 is made of a rare-earth-transition-metal alloy that exhibits the perpendicular magnetization from room temperature to the Curie temperature ($T_{c3}$) and that has a compensation temperature ($T_{comp3}$) between room temperature and $T_{c3}$. The composition of the rare-earth-transition-metal alloy is determined so that, at room temperature, the magnetic moment of the rare-earth metal becomes greater than the magnetic moment of the transition metal, that is, so that the rare-earth metal is richer than the transition metal. It is desirable for the auxiliary layer 5 to have a small coercive force at room temperature; therefore, it is desirably set to not more than 80 kA/m. $T_{c3}$ is desirably set within the range of 200° to 300° C.

In the above arrangement, when a light-modulation overwriting operation is carried out, the auxiliary layer 5 is first initialized. In other words, prior to an irradiation of the light beam 16, the magnetic field $H_{init}$ is applied to the auxiliary layer 5 so as to arrange the magnetization directions of the auxiliary layer 5 in one direction (upward in the drawing).

Figure 2:
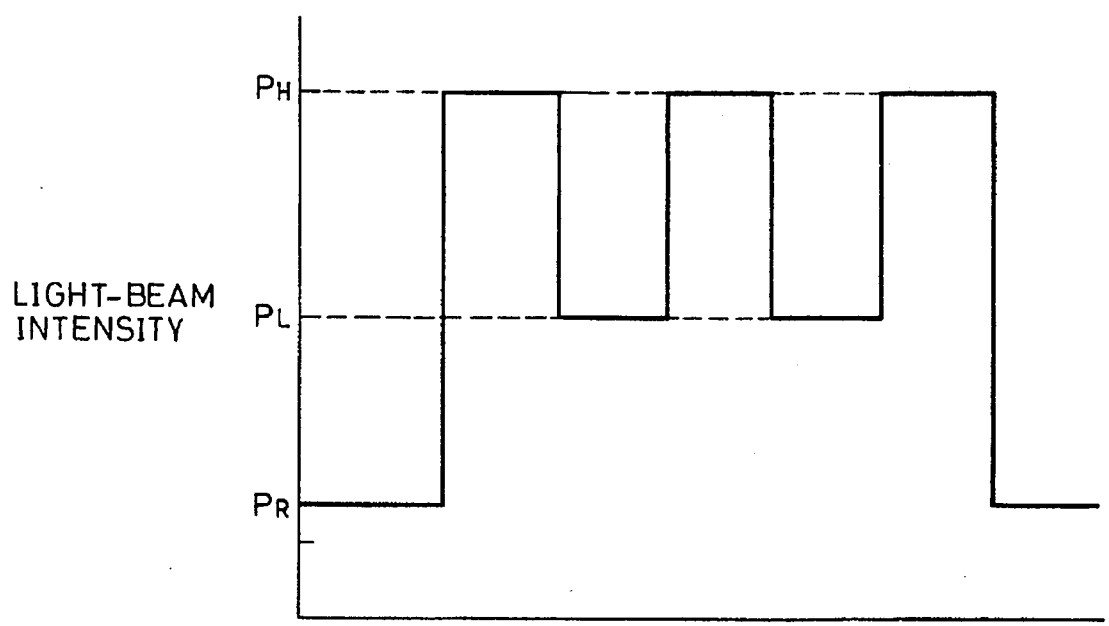
FIG. 2 is a graph showing the intensity change of a light beam during a light-modulation overwriting operation in the magneto-optical disk apparatus of FIG. 1.

Then, information is rewritten through the overwriting operation by modulating the intensity of the light beam 16 into high power level ($P_H$) and low power level ($P_L$), as shown in FIG. 2, in accordance with the information, while applying a writing magnetic field $H_w$ having the same direction as the initializing magnetic field $H_{init}$ from the magnet 15 to an area which is being irradiated by the light beam 16.

Figure 3:
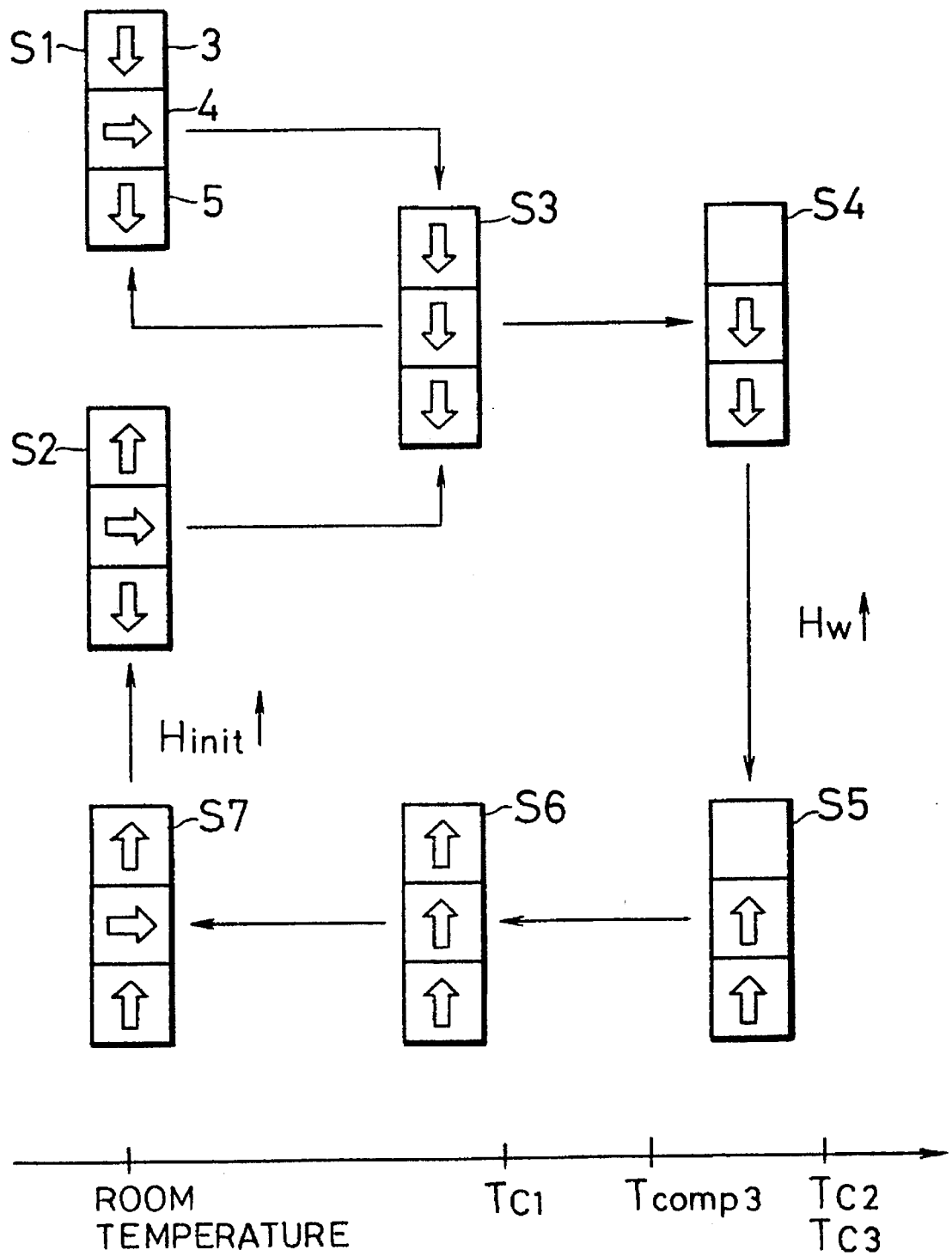
FIG. 3 is an explanatory drawing that shows the light-modulation overwriting operation in the magneto-optical disk apparatus of FIG. 1.
Figure 4A:
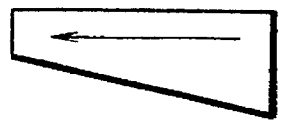
FIG. 4 is an explanatory drawing that shows a modified example of a magnet used in the magneto-optical disk apparatus of FIG. 1.
Figure 4B:
Figure 4C:
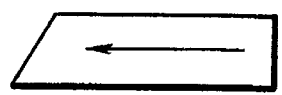
Figure 4D:
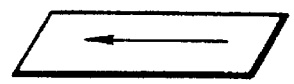
Figure 4E:
Figure 4F:

Referring to FIG. 3, the following description will discuss the principle of the light-modulation overwriting operation of the present invention. In FIG. 3, the horizontal axis represents temperature, and the voided arrows represent the directions of sublattice magnetization of transition metals used in the respective layers 3 through 5.

After having applied the magnetic field $H_{init}$ to the auxiliary layer 5 from the magnet 15, two stable states S1 and S2 exist at room temperature in accordance with the direction of sublattice magnetization of the recording layer 3. Since the coercive force of the auxiliary layer 5 is small, the total magnetization (not shown) has the same direction as the magnetic field $H_{init}$. Since the auxiliary layer 5 is rare-earth-metal rich, the total magnetization has the direction opposite to that of the sublattice magnetization of the transition metal. Therefore, the sublattice magnetization of the transition metal, as shown in FIG. 3, has the direction opposite to that of $H_{init}$. Here, the sublattice magnetization of the transition metal is referred to simply as the sublattice magnetization, and the total magnetization is referred to simply as the magnetization.

When the light beam 16 of $P_H$ is projected, the temperature of the area irradiated by the light beam 16 rises up to the vicinity of $T_{c3}$. Therefore, the sublattice magnetization of the recording layer 3 becomes zero; the intermediate layer 4 comes to exhibit the perpendicular magnetization; and the magnetization of the auxiliary layer 5 has the same direction as the sublattice magnetization. Thus, the sublattice magnetization of the auxiliary layer 5 is reversed to exhibit the same direction as $H_w$. The magnetization of the intermediate layer 4 is arranged to exhibit the same direction as the auxiliary layer 5 due to an exchange coupling force that is exerted on an interface between the intermediate layer 4 and the auxiliary layer 5. In other words, states S1 and S2 are shifted to state S5 through states S3 and S4.

When the irradiation area of the light beam 16 is shifted because of the rotation of the magneto-optical disk, the layers 3 through 5 cool off. When the temperature of the recording layer 3 drops to the vicinity of $T_{c1}$, the magnetization direction of the recording layer 3 becomes coincident with that of the intermediate layer 4 due to an exchange coupling force that is exerted on an interface between the recording layer 3 and the intermediate layer 4. When it further drops to room temperature, the intermediate layer 4 comes to exhibit the in-plane magnetization, and the exchange coupling force is no loner exerted between the recording layer 3 and the auxiliary layer 5. In other words, state S5 is shifted to state S7 through state S6.

When the magneto-optical disk further rotates so that the magnetic field $H_{init}$ is applied at room temperature, the recording layer 3, which has a greater coercive force, remains to have the same magnetization direction, while the auxiliary layer 5, which has a smaller coercive force, has the reversed magnetization direction that is opposite to the direction given by $H_w$. In other words, state S7 is shifted to S2.

In contrast, when the light beam 16 of $P_L$ is projected, the temperature of the auxiliary layer 5 rises merely up to the vicinity of $T_{c1}$. Therefore, the magnetization direction of the auxiliary layer 5 is not reversed by $H_w$. The magnetization direction of the recording layer 3 becomes coincident with that of the auxiliary layer 5 in the same manner as described above. In other words, states S1 and S2 are shifted to S3.

When the irradiation area of the light beam 16 is shifted because of the rotation of the magneto-optical disk, the layers 3 through 5 cool off. When they have cooled off to reach room temperature, the intermediate layer 4 comes to exhibit the in-plane magnetization, and the exchange coupling force is no loner exerted between the recording layer 3 and the auxiliary layer 5. In other words, state S3 is shifted to state S1.

As described above, in the case Of projecting the light beam 16 of $P_H$, the recording layer 3 is brought into state S2 having the upward magnetization (upward sublattice magnetization), and in the case of projecting the light beam 16 of $P_L$, it is brought into state S1 having the downward magnetization (downward sublattice magnetization). This arrangement allows the light-modulation overwriting operation.

In particular, since the auxiliary layer 5 has $T_{comp3}$ between room temperature and $T_{c3}$, $H_w$ and $H_{init}$ are allowed to have the same direction. Therefore, it is possible to generate $H_w$ and $H_{init}$ that are perpendicular to the magneto-optical disk by installing a single magnet 15 so that a connecting line passing through both of the poles is virtually parallel to the magneto-optical disk.

Moreover, since the intermediate layer 4 that exhibits the in-plane magnetization at room temperature is provided between the recording layer 3 and the auxiliary layer 5, no exchange coupling force is exerted between the recording layer 3 and the auxiliary layer 5 at room temperature. For this reason, it is only necessary to set $H_{init}$, which is applied at room temperature, to be greater than the coercive force of the auxiliary layer 5. This makes it possible to miniaturize the magnet 15.

Upon reproducing recorded information, the light beam 16 of reproducing power level ($P_R$), which is weaker than $P_L$, is projected onto the recording layer 3, and the rotation of polarization plane of the reflected light beam, which is caused by the magneto-optical effect, is detected.

Assuming that the coercive force of the auxiliary layer 5 is 80 kA/m, the intensity and layout of the magnet 15 are determined so that an upward magnetic field in the order of 100 kA/m is generated above the magnetic pole (N-pole in FIG. 1) of the magnet 15 while an upward magnetic field in the order of 15 kA/m is generated at the irradiation area of the light beam 16.

Specifically, for use as the magnet 15, for example, $SmCo_5$ magnets, rare-earth magnets such as Nd—Fe—B magnets, Alnico magnets, Fe—Cr—Co magnets, ferrite magnets, and bond magnets are suitable.

In the magneto-optical disk apparatus shown in FIG. 1, for example, a permanent magnet of Nd-type of 1.21T is adopted as the magnet 15. The magnet 15 has a size of 100 mm in width (in the radial direction of the magneto-optical disk)×30 mm in height×20 mm in length (in the rotation direction of the magneto-optical disk). Here, the substantial distance (hereinafter, referred to as "Gap") from the magneto-optical disk is 1 mm, and the distance (hereinafter, referred to as "Distance") between the end of the magnet 15 and the spot of the laser light beam is 12 mm. Using the magnet 15 of this size under the conditions where the intensity of the light beam 16 is set to 10 mW at high power level ($P_H$); to 2 mW at low power level ($P_L$); and to 1 mW at reproducing power level ($P_R$), test recordings were made with the recording bit length of 0.65 μm, and successful light-modulation overwriting operations which were free from residual recordings were obtained. Further, at this time the signal-to-noise ratio (C/N) was 46 dB.

Moreover, in the case of using the permanent magnet of Nd-type of 1.21T as described above, also under conditions where the size of the magnet 15, Gap, and Distance were determined as shown in Tables 1 and 2, successful light-modulation overwriting operations which were free from residual recordings were achieved, and the signal-to-noise ratio (C/N) of 46 dB was obtained.

As to the magnet 15, besides the above-mentioned rectangular parallelopiped one, various types of magnets may be adopted as long as a connecting line passing through both of the poles is virtually parallel to the magneto-optical disk.

For example, as shown in FIGS. 4(a) through 4(f), those types includes the following: one having different thicknesses in its right and left sides; one having its magnetic-pole faces tilted toward the magneto-optical disk side; one having different distances from the magneto-optical disk in its right and left sides; and ones that are made by combining those shapes and layouts.

TABLE 1

| Width (mm) | Height (mm) | Length (mm) | Gap (mm) | Distance (mm) |
|---|---|---|---|---|
| 20 | 10 | 24 | 0.5 | 8–14 |
| 20 | 10 | 24 | 1.0 | 8–14 |
| 20 | 9 | 24 | 0.5 | 7–13 |
| 20 | 9 | 24 | 1.0 | 7–13 |
| 20 | 8 | 24 | 0.5 | 6–12 |
| 20 | 8 | 24 | 1.0 | 6–12 |
| 20 | 7 | 24 | 0.5 | 6–12 |
| 20 | 7 | 24 | 1.0 | 6–12 |
| 20 | 6 | 24 | 0.5 | 5–11 |
| 20 | 6 | 24 | 1.0 | 5–11 |
| 20 | 5 | 24 | 0.5 | 5–10 |
| 20 | 5 | 24 | 1.0 | 5–10 |
| 20 | 4 | 24 | 0.5 | 4–9 |
| 20 | 4 | 24 | 1.0 | 4–9 |
| 20 | 3 | 24 | 0.5 | 3–8 |
| 20 | 3 | 24 | 1.0 | 3–8 |
| 20 | 2 | 24 | 0.5 | 2–6 |
| 20 | 2 | 24 | 1.0 | 2–6 |
| 20 | 1 | 24 | 0.5 | 2–3 |
| 20 | 1 | 24 | 1.0 | 2–4 |
| 20 | 6 | 26 | 0.5 | 5–11 |
| 20 | 6 | 26 | 1.0 | 5–11 |
| 20 | 5 | 26 | 0.5 | 5–10 |
| 20 | 5 | 26 | 1.0 | 5–10 |
| 20 | 4 | 26 | 0.5 | 4–9 |
| 20 | 4 | 26 | 1.0 | 4–9 |
| 20 | 3 | 26 | 0.5 | 3–7 |
| 20 | 3 | 26 | 1.0 | 3–8 |
| 20 | 2 | 26 | 0.5 | 2–5 |
| 20 | 2 | 26 | 1.0 | 2–6 |
| 20 | 1 | 26 | 0.5 | 2–3 |
| 20 | 1 | 26 | 1.0 | 2–4 |
| 24 | 6 | 24 | 0.5 | 5–11 |
| 24 | 6 | 24 | 1.0 | 5–11 |
| 24 | 5 | 24 | 0.5 | 5–10 |
| 24 | 5 | 24 | 1.0 | 5–11 |
| 24 | 4 | 24 | 0.5 | 4–9 |
| 24 | 4 | 24 | 1.0 | 4–10 |
| 24 | 3 | 24 | 0.5 | 3–7 |
| 24 | 3 | 24 | 1.0 | 3–8 |
| 24 | 2 | 24 | 0.5 | 2–5 |
| 24 | 2 | 24 | 1.0 | 3–6 |
| 24 | 1 | 24 | 0.5 | 2–3 |
| 24 | 1 | 24 | 1.0 | 2–4 |
| 26 | 6 | 26 | 0.5 | 5–11 |
| 26 | 6 | 26 | 1.0 | 5–11 |
| 26 | 5 | 26 | 0.5 | 5–10 |
| 26 | 5 | 26 | 1.0 | 5–11 |
| 26 | 4 | 26 | 0.5 | 4–9 |
| 26 | 4 | 26 | 1.0 | 4–10 |
| 26 | 3 | 26 | 0.5 | 3–7 |
| 26 | 3 | 26 | 1.0 | 3–8 |
| 26 | 2 | 26 | 0.5 | 2–5 |
| 26 | 2 | 26 | 1.0 | 3–6 |
| 26 | 1 | 26 | 0.5 | 2–3 |
| 26 | 1 | 26 | 1.0 | 2–4 |
| 27 | 6 | 27 | 0.5 | 5–11 |
| 27 | 6 | 27 | 1.0 | 5–11 |
| 27 | 5 | 27 | 0.5 | 5–11 |
| 27 | 5 | 27 | 1.0 | 5–11 |
| 27 | 4 | 27 | 0.5 | 4–9 |
| 27 | 4 | 27 | 1.0 | 4–10 |
| 27 | 3 | 27 | 0.5 | 3–7 |
| 27 | 3 | 27 | 1.0 | 3–8 |
| 27 | 2 | 27 | 0.5 | 2–5 |
| 27 | 2 | 27 | 1.0 | 3–6 |
| 27 | 1 | 27 | 0.5 | 2–3 |

TABLE 1-continued

| Width (mm) | Height (mm) | Length (mm) | Gap (mm) | Distance (mm) |
|---|---|---|---|---|
| 27 | 1 | 27 | 1.0 | 2–4 |
| 24 | 2 | 10 | 0.5 | 3 |
| 24 | 1.5 | 10 | 0.5 | 2.5 |
| 24 | 1.2 | 10 | 0.4 | 2 |
| 24 | 0.9 | 10 | 0.3 | 1.5 |
| 24 | 1.4 | 10 | 0.5 | 2.5 |
| 24 | 1.1 | 10 | 0.4 | 2 |
| 24 | 0.8 | 10 | 0.3 | 1.5 |

Moreover, the magnet 15 may be designed so that a magnetic field from one magnetic pole is exerted more effectively than that from the other magnetic pole by constructing it in combination with yokes made of soft magnetic material. Furthermore, electro-magnets may be adopted.

The following description will discuss a specific example of the magneto-optical disk.

The substrate 1, which is a disk made of glass, measures 86 mm in diameter, 15 mm in inner-diameter, and 1.2 mm in thickness. Although not shown in the drawings, guide tracks for guiding a light beam are formed in one side of the surfaces of the substrate in the shape of recessed and raised portions. An AlN layer having a thickness of 80 nm, which is provided as a transparent dielectric layer 2, is formed on the side of the substrate 1 wherein the guide tracks are formed.

Further, a thin film of a rare-earth-transition-metal alloy, DyFeCo, having a thickness of 40 nm, which is provided as a recording layer 3, is formed on the dielectric layer 2. The composition of the DyFeCo is represented by $Dy_{0.21}(Fe_{0.81}Co_{0.19})_{0.79}$, which is richer in transition metal. Its $T_{c1}$ is virtually 180° C., and its coercive force is in the order of 1200 kA/m at room temperature.

A thin film of a rare-earth-transition-metal alloy, GdFeCo, having a thickness of 30 nm, which is provided as an intermediate layer 4, is formed on the recording layer 3. The composition of the GdFeCo is represented by $Gd_{0.30}(Fe_{0.68}Co_{0.32})_{0.70}$, which is richer in rear-earth metal. Its Curie temperature ($T_{c2}$) is virtually 250° C., and its compensation temperature ($T_{comp2}$) is virtually 200° C.

A thin film of a rare-earth-transition-metal alloy, GdDyFeCo, having a thickness of 50 nm, which is provided as an auxiliary layer 5, is formed on the intermediate layer 4. The composition of the GdDyFeCo is represented by $(Gd_{0.40}Dy_{0.60})_{0.27}(Fe_{0.70}Co_{0.30})_{0.73}$, which is richer in rare-earth metal. Its $T_{c3}$ is virtually 250° C., its coercive force is not more than 80 kA/m at room temperature, and its $T_{comp3}$ is virtually 200° C.

An AlN layer having a thickness of 20 nm, which is provided as a protective layer 6, is formed on the auxiliary layer 5.

A layer of ultraviolet-ray hardening resin of the polyurethane-acrylate family, having a thickness of 5 μm, which is provided as an overcoat layer 7, is formed on the protective layer 6.

Figure 5:
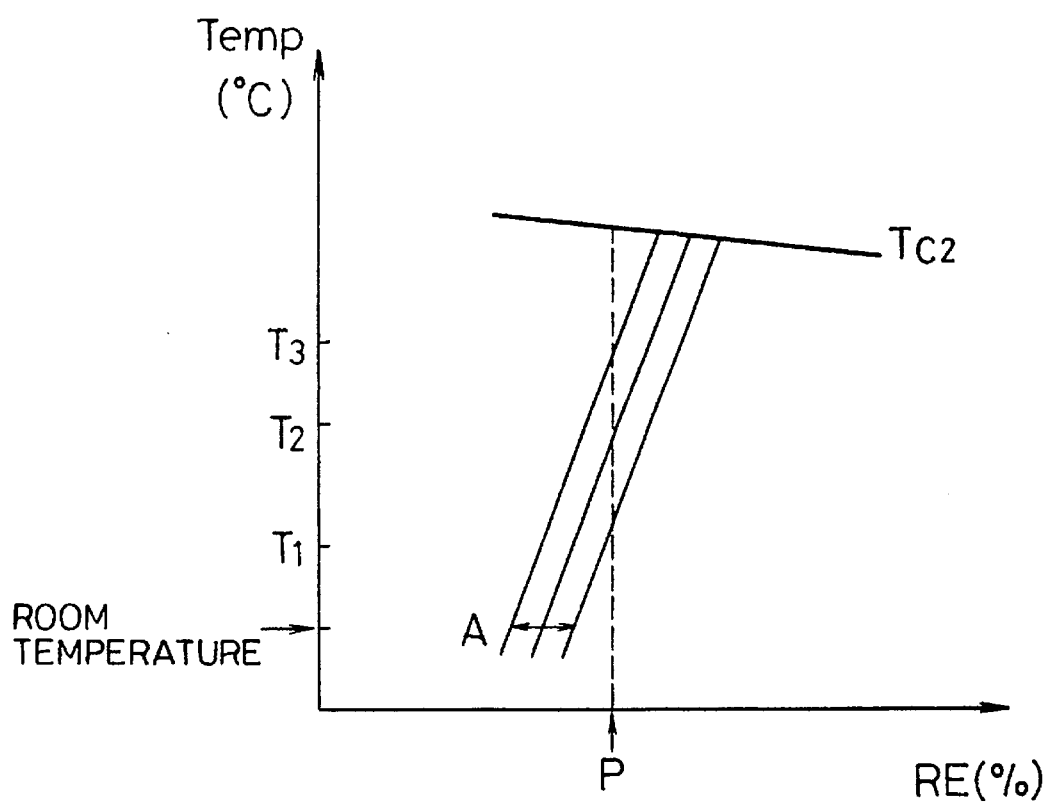
FIG. 5 is an explanatory drawing that shows the magnetic properties of an intermediate layer in the magneto-optical disk of FIG. 1.

As shown in FIG. 5 indicating a magnetic condition, the rare-earth-transition-metal alloy used as the intermediate layer 4 has a very narrow composition range (indicated by A in FIG. 5) wherein the perpendicular magnetization appears. This is because the perpendicular magnetization only appears in the vicinity of a compensation composition (indicated by P in FIG. 5) wherein the moments of the rare-earth metal and the transition metal balance each other.

Magnetic moments of a rare-earth metal and a transition metal have different temperature characteristics, and at high temperatures, the magnetic moment of the transition metal becomes greater than that of the rare-earth metal. For this reason, the intermediate layer 4 is designed so as to have a greater content of the rare-earth metal in comparison with the compensation composition at room temperature, and the intermediate layer 4 is thus allowed to exhibit not the perpendicular magnetization, but the in-plane magnetization at room temperature. In this case, upon irradiation by a light beam 16, the temperature of the irradiated area rises, and the magnetic moment of the transition metal becomes relatively greater until it balances the magnetic moment of the rare-earth metal, thereby allowing the intermediate layer 4 to exhibit the perpendicular magnetization.

FIGS. 6 through 9 show one example of hysteresis characteristics of the intermediate layer 4. The horizontal axis represents the external magnetic field (Hex) that is applied to the film surface of the intermediate layer 4 in the vertical direction; and the vertical axis represents the polar Kerr rotation angle (θk) that is obtained when a light beam is incident to the film surface in the vertical direction in the same manner as described above.

Figure 6:
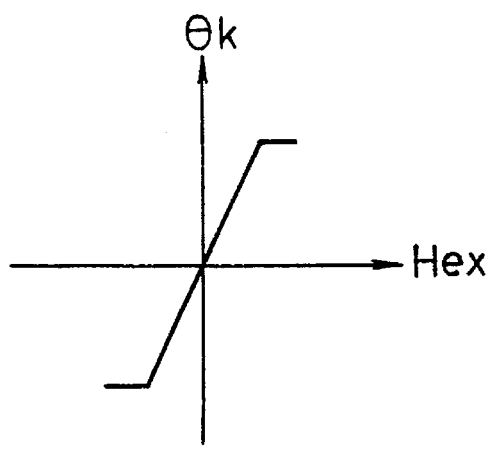
FIG. 6 is an explanatory drawing that indicates the relationship between the externally-applied magnetic field to be applied onto the intermediate layer and the magnetic Kerr rotation angle, from room temperature to temperature $T_1$ of FIG. 5.
Figure 7:
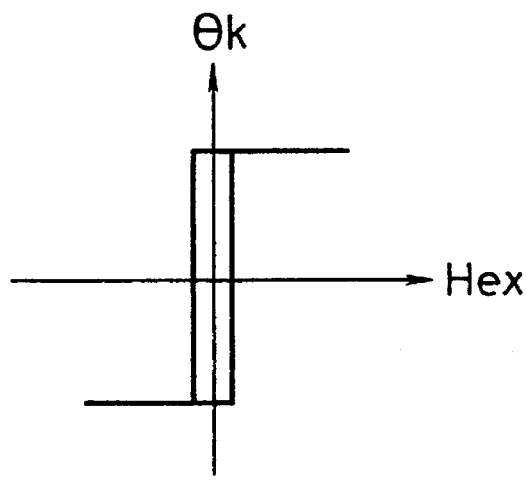
FIG. 7 is an explanatory drawing that indicates the relationship between the externally-applied magnetic field to be applied onto the intermediate layer and the magnetic Kerr rotation angle, from temperature $T_1$ to temperature $T_2$ of FIG. 5.
Figure 8:
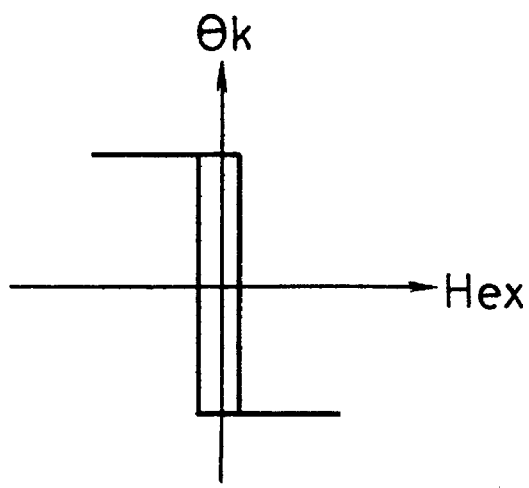
FIG. 8 is an explanatory drawing that indicates the relationship between the externally-applied magnetic field to be applied onto the intermediate layer and the magnetic Kerr rotation angle, from temperature $T_2$ to temperature $T_3$ of FIG. 5.
Figure 9:
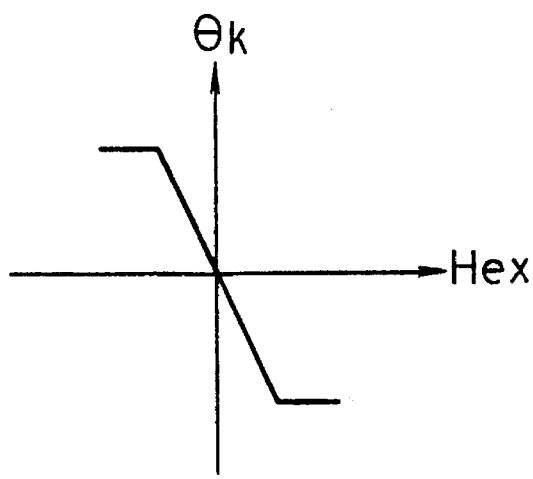
FIG. 9 in an explanatory drawing that indicates the relationship between the externally-applied magnetic field to be applied onto the intermediate layer and the magnetic Kerr rotation angle, from temperature $T_3$ to the Curie temperature $T_{c2}$.

FIG. 6 shows the hysteresis characteristics of the intermediate layer 4 having composition P in the range from room temperature to temperature $T_1$ in the magnetic-condition drawing of FIG. 5. FIGS. 7 through 9 respectively show the hysteresis characteristics within respective ranges: from temperature $T_1$ to temperature $T_2$; from temperature $T_2$ to temperature $T_3$; and from temperature $T_3$ to the Curie temperature $T_{c2}$.

These drawings show that there appears an abruptly rising hysteresis characteristic of the polar Kerr rotation angle in relation to the externally-applied magnetic field within the range from temperature $T_1$ to temperature $T_2$; however, within the other ranges except for the above-mentioned range, the polar Kerr rotation angle is almost zero.

An appropriate combination of the recording layer 3, the intermediate layer 4 and the auxiliary layer 5 allows the intermediate layer 4 to have the magnetization direction that stays virtually in the in-plane direction at room temperature (that is, the direction in parallel with the film surface of the intermediate layer 4) and that is shifted from the in-plane direction to the perpendicular direction within the range from 80° to 125° C.

The following description will discuss a manufacturing method of the above-mentioned magneto-optical disk.

The guide tracks on the surface of the glass substrate 1 are directly formed by the reactive ion-etching method.

The transparent dielectric layer 2, the recording layer 3, the intermediate layer 4, the auxiliary layer 5, and the protective layer 6 are formed in the same sputtering apparatus through the sputtering method while maintaining a predetermined degree of vacuum. The AlN layers of the transparent dielectric layer 2 and the protective layer 6 are formed through the reactive sputtering method wherein sputtering is made by the use of an Al target in $N_2$ gas atmosphere. The recording layer 3, the intermediate layer 4 and the auxiliary layer 5 are formed through the reactive sputtering method wherein sputtering is made in Ar gas atmosphere by the use of a so-called composite target that is made of an FeCo alloy target having GD or Dy chips arranged thereon, or an alloy target of GdFeCo, or an alloy target of DyFeCo and GdFeCo.

The overcoat layer 7 is formed through a method wherein after applying ultraviolet-ray hardening resin, the ultraviolet-ray hardening resin is hardened by ultraviolet radiation from a ultraviolet-irradiation device.

In the present embodiment, DyFeCo is adopted as the material of the recording layer 3; yet, besides this, TbFeCo, GdTbFe, NdDyFeCo, GdDyFeCo, GdTbFeCo, and other materials may be adopted.

Moreover, if at least one element among Nd, Pt, Pr and Pd is added to these materials, the polar Kerr rotation angle is increased with respect to short wavelengths without impairing the characteristics that are required for the recording layer 3. This makes it possible to provide a magneto-optical disk that is capable of producing high-quality reproduced signals even in the case of using a short-wavelength light beam.

Additionally, the thickness of the recording layer 3, which is determined in accordance with the material, composition and thickness of the intermediate layer 4, is preferably set to 20 to 60 nm.

The above-mentioned composition, GdFeCo, of the intermediate layer 4 is not intended to be limited to $Gd_{0.30}(Fe_{0.68}Co_{0.32})_{0.70}$. Any materials may be used as the intermediate layer 4 as long as they exhibit the in-plane magnetization at room temperature and have a transition from the in-plane magnetization to the perpendicular magnetization at temperatures above room temperature. As to rare-earth-transition-metal alloy, the compensation temperature, at which the magnetizations of the rare-earth metal and the transition metal balance each other, changes when the ratio of the rare-earth metal and the transition metal is altered. Since GdFeCo belongs to the material system that exhibits the perpendicular magnetization in the vicinity of the compensation temperature, the temperature at which a transition occurs from the in-plane magnetization to the perpendicular magnetization changes when the compensation temperature is altered by changing the ratio of Gd and FeCo.

Figure 10:
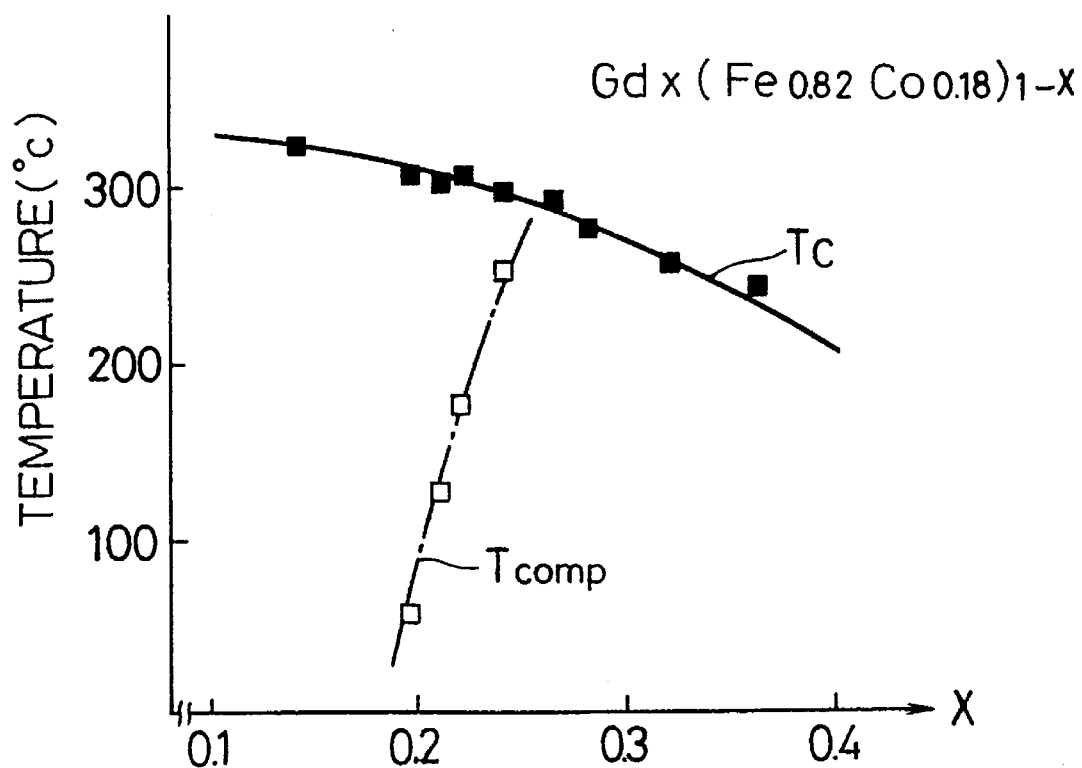
FIG. 10 is a graph that indicates the composition dependency of $Gd_x(Fe_{0.82}Co_{0.18})_{1-x}$ between the Curie temperature $(T_c)$ and the compensation temperature $(T_{comp})$.

FIG. 10 shows the results of researches wherein the compensation temperature and the Curie temperature were examined while changing X in the material system of $Gd_X(Fe_{0.82}Co_{0.18})_{1-X}$, that is, the composition of Gd.

As is clearly shown by FIG. 10, when X is not less than 0.18, a composition range wherein the compensation temperature resides above temperatures not less than room temperature (25° C.) is obtained. Within this range, it is desirable to select a range of $0.19<X<0.29$. Within this range, in the arrangement wherein the intermediate layer 4 and the auxiliary layer 5 are laminated on the recording layer 3, the temperature at which the magnetization direction of the intermediate layer 4 is shifted from the in-plane direction to the perpendicular direction virtually resides from room temperature to 200° C. When this temperature is too high, a high power level of recording light beam is required, thereby making the power-level margin small. Therefore, this might cause adverse effects on stable recording operations.

Next, an explanation will be given on the changes in the characteristics (the compensation temperature and the Curie temperature) in the case of changing the ratio of Fe and Co with respect to the above-mentioned material system, GdFeCo, that is, in the case of changing Y in $Gd_X(Fe_{1-Y}Co_Y)_{1-X}$.

Figure 11:
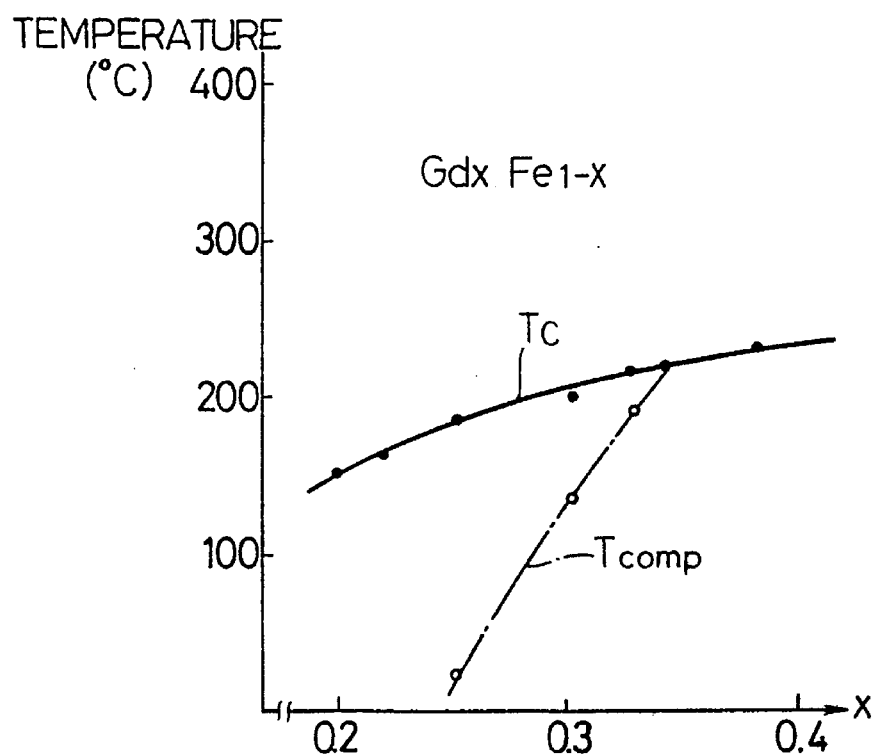
FIG. 11 is a graph that indicates the composition dependency of $Gd_xFe_{1-x}$ between the Curie temperature $(T_c)$ and the compensation temperature (Tcomp).

FIG. 11 shows the characteristics of $Gd_XFe_{1-X}$, which was examined in the case when Y=0. In FIG. 11, when the composition of Gd is represented by, for example, X=0.3, the compensation temperature is approximately 120° C. and the Curie temperature is approximately 200° C.

Figure 12:
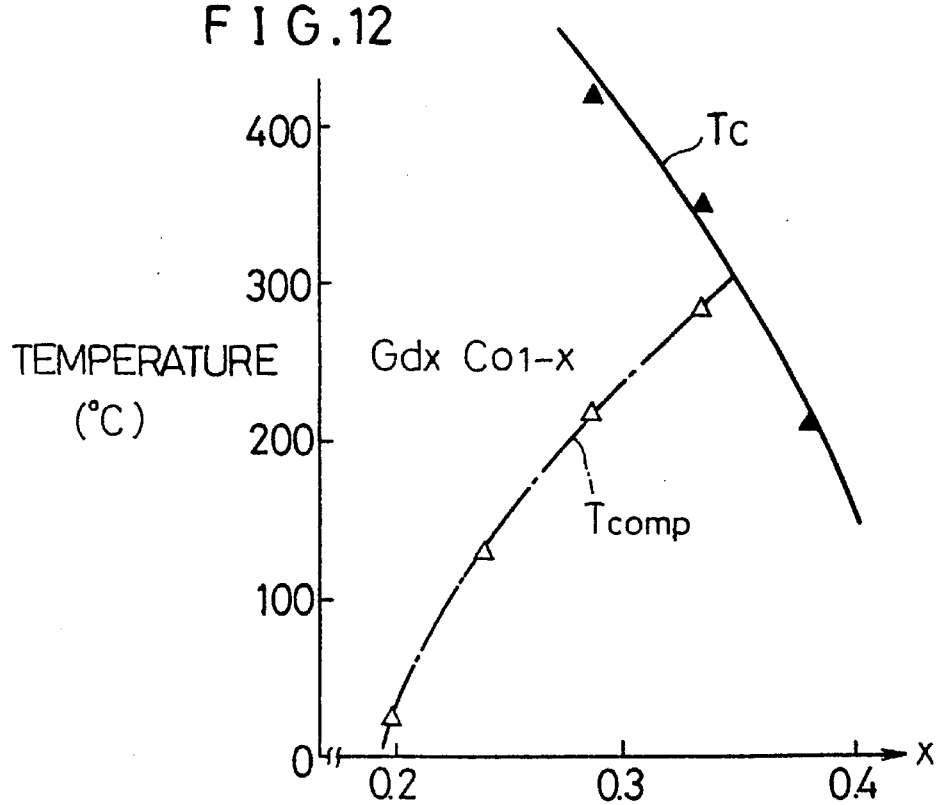
FIG. 12 is a graph that indicates the composition dependency of $Gd_xCo_{1-x}$ between the Curie temperature $(T_c)$ and the compensation temperature $(T_{comp})$.
Figure 13:
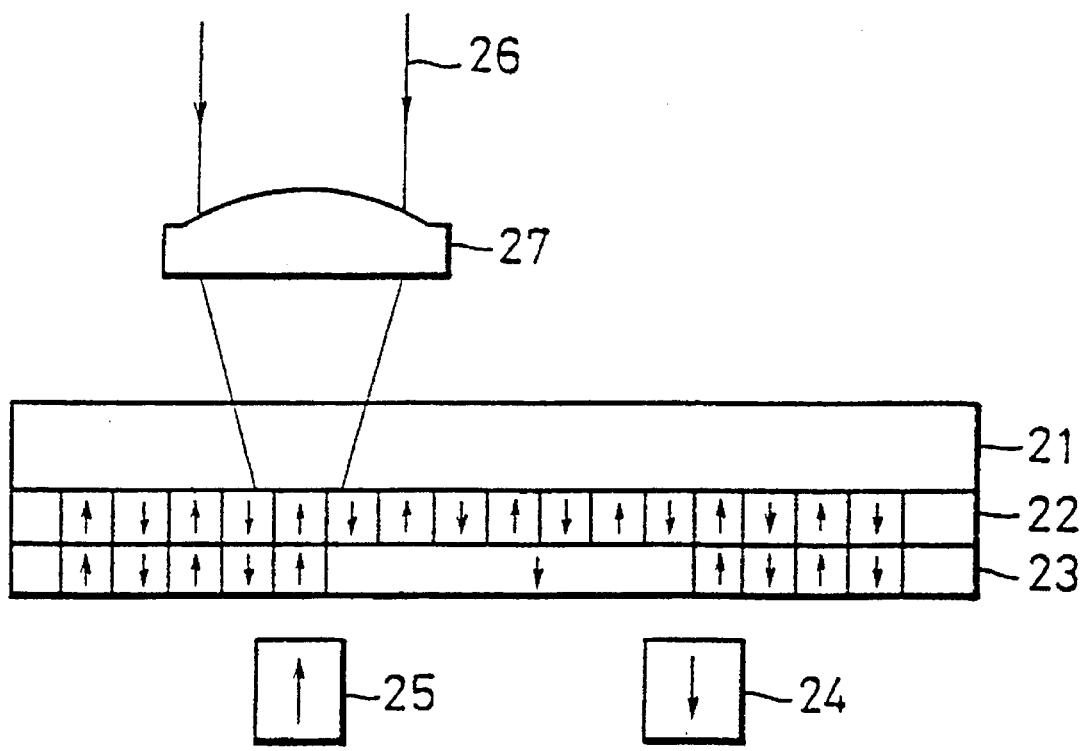
FIG. 13 is a schematic illustration of a conventional magneto-optical disk and magneto-optical disk apparatus.

FIG. 12 shows the characteristics of $Gd_XCo_{1-X}$, which was examined in the case when Y=1. In FIG. 12, when the composition of Gd is represented by, for example, X=0.3, the compensation temperature is approximately 220° C. and the Curie temperature is approximately 400° C.

The above-mentioned facts show that even if the composition of Gd is the same, the compensation temperature and the Curie temperature rise as the amount of Co increases. In accordance with FIGS. 11 and 12, the value of Y is preferably set to a range of $0.1<Y<0.5$ in $Gd_X(Fe_{1-Y}Co_Y)_{1-X}$.

In the above-mentioned intermediate layer 4, the characteristics, such as the temperature at which the in-plane magnetization is shifted to the perpendicular magnetization, are inevitably subjected to effects from the compositions, thicknesses, etc. of the recording layer 3 and the auxiliary layer 5. This is because magnetic exchange coupling forces are exerted between the interfaces of those layers. Therefore, the optimum composition and thickness of the intermediate layer 4 change depending on the materials, compositions and thicknesses of the recording layer 3 and the auxiliary layer 5.

As described above, as to the material of the intermediate layer 4 of the magneto-optical disk of the present invention, it is most desirable to adopt GdFeCo which makes an abrupt transition from the in-plane magnetization to the perpendicular magnetization. However, the following rare-earth-transition-metal alloys are also applicable with the same effects.

$Gd_XFe_{1-X}$, which has characteristics as shown in FIG. 11, has a compensation temperature above room temperature within a range of $0.24<X<0.35$.

$Gd_XCo_{1-X}$, which has characteristics as shown in FIG. 12, has a compensation temperature above room temperature within a range of $0.20<X<0.35$.

In the case of using an FeCo alloy as the transition metal, $Tb_X(Fe_YCo_{1-Y})_{1-X}$ has a compensation temperature above room temperature within a range of $0.20<X<0.30$ (in this case, Y is an arbitrary value). $Dy_X(Fe_YCo_{1-Y})_{1-X}$ has a compensation temperature above room temperature within a range of $0.24<X<0.33$ (in this case, Y is an arbitrary value). $Ho_X(Fe_YCo_{1-Y})_{1-X}$ has a compensation temperature above room temperature within a range of $0.25<X<0.45$ (in this case, Y is an arbitrary value).

In the above-mentioned embodiment, the thickness of the intermediate layer 4 is set to 30 nm; yet, the thickness is not intended to be limited to this value. As described earlier, since the magnetic characteristics of the intermediate layer 4 are subjected to the effects of the recording layer 3 and the auxiliary layer 5, the thickness of the recording layer 3 is altered depending on the materials and compositions of those layers. Here, it is necessary to set the thickness of the intermediate layer 4 to not less than 20 nm. However, an excessive thickness of the intermediate layer 4 makes it difficult to copy information onto the recording layer 3; therefore, it is preferable to set the thickness to not more than 50 nm.

In the above-mentioned embodiment, GdDyFeCo is adopted as the material of the auxiliary layer 5; yet, besides this, materials such as DyFeCo, TbFeCo, GdTbFe, NdDyFeCo, GdTbFeCo, and GdTbFeCo may be adopted. Here, the thickness of the auxiliary layer 5, which is determined depending on the material, composition and thickness of the intermediate layer 4, is preferably set in the range of 20 to 100 nm.

The film thickness of AlN of the transparent dielectric layer 2 is not intended to be limited to 80 nm. The film thickness of the dielectric layer 2 is determined by taking into consideration the so-called Kerr-effect enhancement by which upon reproducing a magneto-optical disk, the polar Kerr rotation angle from the recording layer 3 is increased by utilizing the coherent effects of light. In order to make the signal quality (C/N) as large as possible, it is necessary to increase the polar Kerr rotation angle; therefore, the film thickness of the transparent dielectric layer 2 is determined so that the polar Kerr rotation angle becomes the largest.

The film thickness varies with the wavelength of the reproduction-use light and the refractive index of the transparent dielectric layer 2. In the present embodiment, AlN having a refractive index of 2.0 is employed with respect to the reproduction-use-light wavelength of 780 nm. Therefore, when the film thickness of AlN of the transparent dielectric layer 2 is set in the order of 30 to 120 nm, it is possible to have a greater Kerr-effect enhancement. Here, it is desirable to set the film thickness of AlN of the transparent dielectric layer 2 in the order of 70 to 100 nm, and within this range the polar Kerr rotation angle becomes virtually the greatest.

As is explained above, the greater the refractive index of the transparent dielectric layer 2, the thinner the film thickness that is required. Further, the greater the refractive index, the greater the enhancing effects of the polar Kerr rotation angle.

AlN varies in its refractive index with changes in the ratio, gas pressures, and other factors of Ar and $N_2$ which are sputtering gases used during the sputtering process. However, AlN has a relatively large refractive index that virtually ranges from 1.8 to 2.1, and is preferably employed as the material of the transparent dielectric layer 2.

Further, the transparent dielectric layer 2 is not only effective in the Kerr-effect enhancement, but also utilized in cooperation with the protective layer 6 for preventing oxidation of the magnetic layers made of the respective rare-earth-transition-metal alloys, that is, the recording layer 3, the intermediate layer 4 and the auxiliary layer 5.

Magnetic films made of rare-earth-transition-metals tend to suffer from oxidation, and in particular the rare-earth metals are more likely to suffer from oxidation. For this reason, without taking proper measures to prevent external oxygen and moisture from entering the films, their characteristics would be seriously deteriorated due to oxidation.

Therefore, the present embodiment has an arrangement wherein both sides of the recording layer 3, the intermediate layer 4 and the auxiliary layer 5 are sandwiched by AlN. AlN forms a nitride film which has no oxygen in its ingredients, and provides an excellent material that has good resistance to moisture.

Moreover, AlN has a relatively great refractive index ranging in the proximity of 2, and it is transparent, and does not contain oxygen in its ingredients; therefore, it provide magneto-optical disks which can maintain stability for a long time. In addition, AlN films are obtained by the reactive DC (direct current) sputtering operation wherein an Al target is utilized in $N_2$ gas atmosphere or in a mixed gas atmosphere of Ar and $N_2$. This operation is more advantageous than the RF (high frequency) sputtering operation because of its high film-forming speed.

As to materials of the transparent dielectric layer 2 other than AlN, the following materials which have relatively great refractive indexes are preferably adopted: SiN, AlSiN, AlTaN, SiAlON, TiN, TiON, BN, ZnS, $TiO_2$, $BaTiO_3$, $SrTiO_3$, etc.

In the present embodiment, the film thickness of AlN of the protective layer 6 is set to 20 nm; yet, it is not intended to be limited to this value. The film thickness of the protective layer 6 is preferably set in the range of 1 to 200 nm.

In the present embodiment, the total film thickness of the magnetic layers, which include the recording layer 3, the intermediate layer 4 and the auxiliary layer 5, is 120 nm, and with this film thickness, the light beam projected from the optical pickup is hardly transmitted through the magnetic layers. Therefore, the film thickness of the protective layer 6 is not necessarily limited; any film thickness is adopted as long as it is sufficient to protect the magnetic layers from oxidation for a long period. If a material having poor resistance to oxidation is adopted, a thick film may be required, while if a material having good resistance to oxidation is adopted, a thin film may be applicable.

The protective layer 6, together with the transparent dielectric layer 2, exerts effects on the recording sensitivity characteristics of the magneto-optical disk by its thermal conductivity. The recording sensitivity characteristics refer to the degree of necessity of laser power that is required for recording or erasing. Most of the light beam that is incident to the magneto-optical disk is transmitted through the transparent dielectric film 2, and absorbed by the recording layer 3, the intermediate layer 4 and the auxiliary layer 5, which are absorbing films, thereby being changed into heat. In this case, heat in the recording layer 3, the intermediate layer 4 and the auxiliary layer 5 is transferred to the transparent dielectric layer 2 as well as to the protective layer 6 through thermal conduction. Therefore, the thermal conductivities and heat capacities (specific heats) of the dielectric layer 2 and the protective layer 6 have effects on the recording sensitivity.

In other words, it is possible to control the recording sensitivity of the magneto-optical disk to a certain extent by changing the film thickness of the protective layer 6. For example, in order to increase the recording sensitivity (in order to record or erase with a lower laser power), the protective layer 6 may be designed to have a thinner film thickness. In most cases, it is advantageous to make the recording sensitivity higher to a certain degree in order to extend the service life of the laser; therefore, the thinner the protective layer 6, the better.

AlN is preferably adopted also for this reason, and it has excellent resistance to moisture. Therefore, when adopted as the protective layer 6, AlN makes the film thickness thinner, thereby making it possible to provide magneto-optical disks with high recording sensitivity.

In the present embodiment, the protective layer 6 and the transparent dielectric layer 2 are made of the same material, AlN; therefore, it is possible to provide magneto-optical disks having excellent resistance to moisture. Further, since the protective layer 6 and the transparent dielectric layer 2 are made of the same material, it is also possible to improve the productivity. Since AlN is a material having excellent resistance to moisture as described earlier, the film thickness is easily set to 20 nm, which is a relatively thinner film thickness. Moreover, taking account of the productivity, it is advantageous to make the film thickness thinner.

As to materials of the protective layer 6, taking account of the aforementioned objectives and effects, the following materials, which are also used as the transparent dielectric layer 2, are preferably employed: SiN, AlSiN, AlTaN, SiAlON, TiN, TiON, BN, ZnS, $TiO_2$, $BaTiO_3$, $SrTiO_3$, etc. Further, it is advantageous to employ the same materials as the transparent dielectric layer 2 from the point of view of the productivity. Among these materials, SiN, AlSiN, AlTaN, TiN, BN, and ZnS, which do not contain oxygen in their ingredients, are especially capable of providing magneto-optical disks having excellent resistance to moisture.

As to materials of the substrate 1, besides the aforementioned glass, the following materials may be adopted: chemically reinforced glass, and the so-called glass substrate with 2P-layer, wherein an ultraviolet-ray hardening resin is formed on a substrate made of the above-mentioned glass; polycarbonate (PC); poly methyl methacrylete (PMMA); amorphous polyolefine (APO); polystyrene (PS); polychlorobiphenyl (PVC); epoxy, etc.

In the case of adopting the chemically reinforced glass as the substrate 1, the following advantages are obtained: it provides excellent mechanical characteristics (resistance to surface vibration, eccentricity, warping, tilting, etc. when used in magneto-optical disks); it will not be easily damaged by sand or dust because of its high hardness; it is not dissolved by various solutions because it is chemically stable; it is dust free because it is less susceptible to electric charge in comparison with plastic; it is less susceptible to cracking because it is chemically reinforced; it ensures long-term reliability of magneto-optical disk because it has excellent resistance to moisture, oxidation and heat; and it provides high signal-quality because of its excellent optical characteristics.

Additionally, in the case of using the above-mentioned glass, or the chemically reinforced glass, it is possible to preliminarily form on the surface of the substrate 1 guide tracks for guiding a light beam and so-called prepits for providing information such as address information by means of the reactive dry etching. Moreover, there is another method wherein after applying ultraviolet-ray hardening resin called the 2-P layer to the glass substrate 1, a mold called a stamper is pressed onto the resin layer, and after hardening the resin by applying ultraviolet ray, the stamper is removed to form the guide tracks, the prepits, etc. on the resin layer.

In the case of adopting PC as the substrate 1, the following advantages are obtained: Since the injection molding is applicable, the substrates 1 of the same type can be produced in a large quantity at low cost. Since it has a lower absorption coefficient compared to other plastics, it ensures long-term reliability of magneto-optical disks. It has excellent resistance to heat and impact. Here, as to materials including the above-mentioned material wherein the injection molding is applicable, if the corresponding stamper is fixed onto the surface of the mold before a injection molding process, guide tracks, prepits, etc. are formed on the surface of the substrate 1 simultaneously with the molding process.

Additionally, in the above-mentioned embodiment, the arrangement wherein the recording layer 3, the intermediate layer 4 and the auxiliary layer 5 are sandwiched by the transparent dielectric layer 2 and the protective layer 6 that are made of transparent dielectric material, was exemplified; yet, another arrangement may be adopted, wherein a reflective layer (not shown) is provided between the protective layer 6 that is made of transparent dielectric material and the overcoat layer 7. Further, a heat-releasing layer (not shown) may be provided between the protective layer 6 and the overcoat layer 7 that are made of transparent dielectric material.

Furthermore, in the above-mentioned embodiment, the explanation was given on the magneto-optical disk as one of the magneto-optical recording media; yet, the present invention is not intended to be limited to this, and is applicable to magneto-optical tapes, magneto-optical cards, and other media. Here, in the case of adopting a magnet-optical tape, a tape base may be employed instead of the substrate 1.

As described earlier, the magneto-optical disk of the present invention is provided with a recording layer 3 that exhibits perpendicular magnetization, an intermediate layer 4 wherein in-plane magnetization occurs at room temperature and a transition from the in-plane magnetization to perpendicular magnetization occurs as the temperature thereof rises, and an auxiliary layer 5 that is made of a rare-earth-transition-metal alloy and that exhibits perpendicular magnetization, and those layers are laminated in this order. The magneto-optical disk is characterized by a composition of the rare-earth-transition-metal alloy that is set so that the magnetic moment of the rare-earth metal is relatively greater than that of the transition metal at room temperature, and the compensation temperature ($T_{comp3}$) is located between room temperature and the Curie temperature ($T_{c3}$).

With the above arrangement, since the intermediate layer 4 is provided in such a manner that the exchange coupling force is no longer exerted between the recording layer 3 and the auxiliary layer 5 at room temperature. This makes it possible to minimize the initializing magnetic field ($H_{init}$) to be applied to the auxiliary layer 5. Moreover, since the composition of the rare-earth-transition-metal alloy of the auxiliary layer 5 is set as described above, $H_{init}$ and $H_w$ (recording magnetic field) have the same magnetization direction. Thus, it becomes possible to apply $H_{init}$ and $H_w$ merely by providing a single magnet 15.

As described earlier, the magneto-optical disk apparatus of the present invention, wherein the above-mentioned magneto-optical disk is used, is provided with the objective lens 17 for converging a light beam 16 onto the magneto-optical disk and a single magnet 15 for applying $H_w$ onto a portion on the magneto-optical disk irradiated by the light beam 16, as well as for applying $H_{init}$ having a greater intensity than $H_w$ onto a portion that is apart from the portion irradiated by the light beam 16. The magnet 15 is disposed so that a connecting line passing through both of the poles of the magnet 15 is virtually parallel to the magneto-optical disk.

This arrangement makes it possible to achieve a more compact, thinner magneto-optical recording apparatus which allows light-modulation overwriting.

Additionally, magneto-optical recording media to be used in the magneto-optical recording apparatus of the present invention are not intended to be limited to only the magneto-optical recording medium of the present embodiment. Any magneto-optical recording media may be also adopted as long as they are used for light-modulation overwriting and have an arrangement wherein the initializing magnetic field and the recording magentic field have the same direction and the initializing magnetic field is set to not more than 240 kA/m.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:
   a recording layer that exhibits perpendicular magnetization and that is adapted for use both in recording and in reproducing information,
   an intermediate layer wherein an in-plane magnetization state exists at room temperature, and a transition from the in-plane magnetization state to a state of perpendicular magnetization occurs as the temperature of said intermediate layer rises; and an auxiliary layer that is made of an alloy of a rare-earth metal and a transition metal and that exhibits perpendicular magnetization, said recording, intermediate, and auxiliary layers being laminated in the foregoing order, wherein the rare-earth-transition-metal alloy of the auxiliary layer has a composition that is so selected that the magnetic moment of the rare-earth metal is relatively greater than than of the transition metal at room temperature, and that the compensation temperature is located between room temperature and the Curie temperature of said alloy of said auxiliary layer.

2. The magneto-optical recording medium as defined in claim 1, wherein the recording layer is made of a rare-earth-transition-metal alloy that exhibits perpendicular magnetization from room temperature to the Curie temperature, the rare-earth-transition-metal alloy having a composition that is set so that the magnetic moment of the transition metal is relatively greater than that of the rare-earth metal at room temperature.

3. The magneto-optical recording medium as defined in claim 1, wherein the intermediate layer is made of a rare-earth-transition-metal alloy whose content of the rare-earth metal is greater than that of the compensation composition at room temperature.

4. The magneto-optical recording medium as defined in claim 1, wherein the auxiliary layer has a coercive force at room temperature that is greater than a coercive force of the recording layer at room temperature and the Curie temperature of the auxiliary layer is greater than the Curie temperature of the recording layer.

5. The magneto-optical recording medium as defined in claim 1, wherein the recording layer is DyFeCo.

6. The magneto-optical recording medium as defined in claim 1, wherein the intermediate layer is GdFeCo.

7. The magneto-optical recording medium as defined in claim 1, wherein the auxiliary layer is GdDyFeCo.

8. A magneto-optical recording apparatus for use with a magneto-optical recording medium including: a recording layer that exhibits perpendicular magnetization; an intermediate layer wherein in-plane magnetization occurs at room temperature and a transition from the in-plane magnetization to perpendicular magnetization occurs as the temperature thereof rises; and an auxiliary layer that is made of a rare-earth-transition-metal alloy and that exhibits perpendicular magnetization, the layers being laminated in this order, wherein the rare-earth-transition-metal alloy of the auxiliary layer has a composition that is set so that the magnetic moment of the rare-earth metal is relatively greater than that of the transition metal at room temperature and the compensation temperature is located between room temperature and the Curie temperature, the magneto-optical recording apparatus comprising:

an objective lens for converging a light beam onto the magneto-optical recording medium; and a single external-magnetic-field applying means for applying a writing magnetic field onto a portion on the magneto-optical recording medium irradiated by the light beam, as well as for applying an initializing magnetic field having a greater intensity than the writing magnetic field on a portion that is apart from the portion irradiated by the light beam, the external-magnetic-field applying means being disposed so that a connecting line passing through both of the poles of the external-magnetic-field applying means is virtually parallel to the magneto-optical recording medium.

9. The magneto-optical recording apparatus as defined in claim 8, wherein the external-magnetic-field applying means is disposed so that the initializing magnetic field is applied onto the auxiliary layer prior to projecting a light beam onto the magneto-optical recording medium.

10. The magneto-optical recording apparatus as defined in claim 8, wherein the intensity of the initializing magnetic field is set to be greater than the coercive force at room temperature of the auxiliary layer in the magneto-optical recording medium.

* * * * *